Patented May 25, 1943

2,320,319

UNITED STATES PATENT OFFICE 2,320,319

OLEAGINOUS MATERIAL

Howard C. Black, Chicago, Ill., assignor to Industrial Patents Corporation, Chicago, Ill., a corporation of Delaware No Drawing. Application May 20 1941,
Serial No. 394,329

23 Claims. (Cl. 99—123)

This invention relates to the preparation of improved fatty materials and more particularly it is directed to non-aqueous fats and oils which do not foam when heated, especially during deep fat frying.

In cooking with fats and oils it has been known for some time that the oil or fat will foam and froth after heating for a substantial period. This is true of practically all fats and oils employed for this purpose whether in a natural or modified, e. g., hydrogenated, condition.

It has been long desired to find a method for overcoming this undesirable property but up until now no solution has been described nor has there been a satisfactory explanation for its cause. An unusual feature of this phenomenon is the fact that the foaming does not take place until the oil or fat has been heated for a substantial period of time. The length of time that any oleaginous material may be used before foaming sets in has now been found to depend on several factors: principally, temperature of heating, length of time of heating, the type of oil, and the amount and type of product cooked therein.

That the material fried in the oleaginous material plays a part is shown by the fact that foaming is increased when sea food, such as fish, and especially clams, are cooked in the deep fat. This might be due to the absorption of fish oil by the deep fat frying material. It is known that fish oils are generally more unsaturated than the common frying agents, and because of the presence of these unsaturated constituents in the frying oil it becomes less stable toward foaming. It has now been demonstrated that unsaturated constituents in the fatty oil are in a large part responsible for the development of foaming during heating. This may be illustrated by the following table showing the time at which bad foaming occurred with bleached cottonseed oil hydrogenated to varying degrees of saturation.

TABLE I

*Bleached cottonseed oil*

| Degree of hydrogenation (in terms of refractive index drop) | Hours before bad foaming occurred |
|---|---|
| 2° drop | 14 |
| 3° drop | 15 |
| 4° drop | 15 |
| 5° drop | 21 |
| 6° drop | 21 |

It has also been discovered that the presence of free fatty acids in the composition likewise tends to increase the tendency to foam. Other results which have been observed to occur along with the foaming are increases in the viscosity of the oil, an increase in the refractive index, and a decrease in iodine number. This change in viscosity, refractive index and iodine value indicates that some chemical transformation is taking place, probably polymerization. It has been observed that the shorter the time before foaming occurs the greater is the decrease in iodine value, the increase in refractive index, the increase in viscosity, and the free fatty acid content.

In the preparation of shortening, it is common practice to attempt to reduce the fatty acid content to a minimum, hence it is not possible to completely overcome foaming in this manner. Furthermore, it is not feasible to completely hydrogenate a shortening preparation in order to remove all unsaturation because the resulting product would be too hard, have too high a melting point, and would be substantially indigestible.

In actual practice, fresh oleaginous material is added to the batch as the oleaginous material being used is lost through absorption by the food being cooked, spattering, and/or the like. This fresh material tends to reduce the foaming slightly but not sufficiently to prevent difficulty in operation.

It has now been found possible to prepare an oleaginous composition which resists foaming when heated to high temperatures for substantial periods of time, for example in deep fat frying. This has been accomplished without sacrificing any of the other desirable properties of the non-aqueous shortening, such as low melting point, digestibility, fluidity, creaming and shortening properties, and/or the like. This result has been attained by the incorporation of a small proportion of one or more materials. These materials have been found to be effective although they fall into three unrelated classes, of which classes other more related members do not satisfactorily function. The materials which have been found to function satisfactorily are:

1. Water-insoluble polyvalent metal (e. g., alkali earth metal) soaps of fatty acids.
2. Water-soluble surface active salts of organic oxygen-containing, non-carboxylic acids.
3. Phosphoric acids.

It is interesting to note that the water-soluble soaps, such as sodium stearate and the like, which one would normally expect to operate in view of the effectiveness of the water-insoluble soaps of the same fatty acids and of the water-soluble organic sulphonic acids, do not effectively function for the present purposes.

It is surprising and unpredictable that these unrelated substances will effectively reduce the tendency for non-aqueous fatty materials to foam. However, it has been discovered that the addition of about 0.0001% to 0.5% of alkaline earth soaps, or about 0.0001% to 1% of said surface active agents, to the non-aqueous fat at any point in its manufacture, preferably after substantial completion of the shortening, will yield a product which greatly resists any tendency to foam during extended heating. Likewise, it has been found that the washing of the oils going into the shortening, preferably before hydrogenation, if this step is included, with dilute phosphoric acid (e. g., about 5%) will retard any tendency for the shortening to foam during heating. Another method for treating the non-aqueous fatty material with phosphoric acid for this same purpose is to add a small amount, e. g., up to about 0.01%, of concentrated phosphoric acid, e. g., 85%, to the fatty compound after hydrogenation in the presence of the nickel hydrogenation catalyst. Any of these methods may be employed alone or in combination to effect maximum improvement in the anti-foaming properties of the deep fat frying agent.

The first class of stabilizing agents includes the water-insoluble, fat-soluble, non-toxic, polybasic metal salts of aliphatic, monobasic, carboxylic acids, such as the calcium, strontium, barium, and/or magnesium salts or soaps of stearic acid, margaric acid, palmitic acid, pentadecanoic acid, myristic acid, tridecanoic acid, lauric acid, undecanoic acid, capric acid, nonoic acid, caprylic acid, heptoic acid, caproic acid, valeric acid, butyric acid, propionic acid, acetic acid, formic acid, behenic acid, oleic acid, elaidic acid, palmitoleic acid, isoleic acid, melissic acid, carnaubic acid, undecenoic acid, elaeostearic acid, linoleic acid, linolenic acid, arachidic acid, behenolic acid, cerotic acid, ricinoleic acid, oxidized petroleum acids, naphthenic acids, and/or abietic acid. These salts may be prepared by any suitable method, either directly from the acids or from the natural oils, fats or waxes containing them, by reaction with the oxides, hydroxides, or carbonates of the above-noted metals, or by an ion exchange reaction of salts of these metals with monobasic salts of the corresponding fatty acid or acids, such as aqueous solutions of the sodium soaps thereof.

The water-soluble, fat-soluble, non-toxic salts of organic, non-carboxylic, poly-oxygen-containing acids which may be employed in the present process include, among others, the aliphatic, cycloaliphatic, heterocyclic and aromatic sulphonates, sulphates and phosphates. Among the suitable materials of this class are the long chain aliphatic primary and secondary sulphates and sulphonates, such as sodium lauryl sulphate, tetraisobutylene sulphonate and sodium cetane hydroxy sulphonates; sulphated polyhydric alcohol partial esters, such as lauric acid monoglyceride monosulphate; sulphonated and sulphated fatty acids and their esters, such as sulphonated oleic acid and sulphated castor oil; sulphonated alkyl esters of fatty acids, such as the lauric acid ester of isethionic acid salts; sulphonated and sulphated alkyl amides of fatty acids, such as the monolaurate of taurine salts; sulphonated and sulphated polybasic acid esters, such as the di-decyl ester of sulphonated succinic acid and dioctyl ester of sulphated succinic acid sodium salt; aryl and alkylated aryl sulphonates, such as polybutylated naphthalene sulphonates, and dodecyl benzene sulphonates; sulphonated petroleum, petroleum extracts, petroleum fractions, cracked petroleum, coal tar fractions, olefines, and the like; long chain, branched or straight, primary or secondary, aliphatic ortho-, meta-, or tetra-phosphates and thio-phosphates; long chain fatty acid partial esters of polyhydric alcohol partial ortho-, meta-, or tetra- thiophosphates and phosphates; and various related materials. The salts of these compounds may be those of sodium, potassium, and the other alkali metals; ammonium; mono-, di-, tri and tetra-alkyl and alkylol ammonium; pyridinium and substituted pyridinium; calcium, barium, strontium, magnesium; and various other metals or positive radicals. The aliphatic substituents may be any having at least four carbon atoms. For example, the lauric acid radical may be substituted by any of the fatty acid radicals recited hereinbefore. The octyl, tetraisobutylene, cetyl, butyl, decyl, and dodecyl groups may be replaced by any other straight, or branched chain, primary, secondary, or tertiary aliphatic groups having at least four carbon atoms.

Among the materials which may be improved by the various agents and treatments disclosed in this application are lard, palm oil, olive oil, cottonseed oil, soy bean oil, coconut oil, oleo oil, lard oil, peanut oil, these oils partially hydrogenated, and various blends of these oils, partially hydrogenated oils, and/or fully hydrogenated oils.

The improved fats and oils may contain other modifying agents, such as fatty acid monoglycerides and other polyhydric alcohol partial esters; alkylolamides of fatty acids; itamalic acid, citric acid, mesaconic acid, tartaric acid, citramalic acid, citraconic acid, fumaric acid, itaconic acid, and other polybasic unsaturated and/or hydroxy substituted acids; polyhydric phenols; gum guaiac and/or the like.

The following examples are given for the purpose of illustrating the present inventions but are not intended to be limiting on the scope thereof.

EXAMPLE I

A blend of 80% cottonseed oil, 15% soy bean oil, and 5% coconut oil is washed with 5% phosphoric acid in the proportion of about 10% of the blended oils with agitation for about 15 minutes. The mixture is permitted to settle and the immiscible layers separated. The blended oils are then hydrogenated with 0.1% Rufert catalyst at a temperature of about 360° to 385° F. and a hydrogen pressure of about thirty pounds per square inch gauge for about one hour until the refractive index at 60° C. has been reduced about four points. To this hydrogenated oil is then added .002% of 85% phosphoric acid. After the acid is incorporated, the hydrogenated oil is filtered to remove the catalyst. This treated oil is then blended with a substantially completely hydrogenated cottonseed oil having a titre of about 60° C. and an iodine number of less than 3 in the proportion of 90% blended hydrogenated oil and 10% hard fat. The mixed product is then deodorized by heating to about 400° F. for five hours while blowing with a slow current of steam and maintaining the mixture under a vacuum. After the temperature has dropped to 325° F., .002% citric acid is added. The product is run over the roll and is then tempered in a constant temperature room at 85° F. for a period of forty-eight hours. This finished product is then heated to a deep fat frying temperature of 375° F. and used for frying bread. Substantially no foaming occurs until after twenty to twenty-four hours of heating, whereas appreciable foaming occurs with similarly prepared shortenings which omit the phosphoric acid treatments before sixteen hours have elapsed.

Similar preparations but separately employing the individual phosphoric acid treatments produce improved shortenings with respect to foam resistance but not to the extent obtained with the double acid treatment. It is important to note that the single treatment of the shortening after removal of the catalyst with phosphoric acid produces a product which foams more than the non-treated shortening.

The phosphoric acid which is used for washing the oleaginous material at some point in the process is preferably 5-20% aqueous phosphoric acid. It is advantageously used in the proportion of 1% to 20% based on the weight of the oleaginous material, but other concentrations or proportions may be employed although less satisfactory. The acid used for treating the fatty material in the presence of the hydrogenation catalyst is concentrated phosphoric acid having a concentration of about 60% acid or higher and usually is employed in the proportion of 0.0001% to 0.01%, based on the weight of the fatty material (preferably saturated and/or monoolefinic) to be treated. Upon heating to temperatures of 300° F. or higher the products improved by the disclosed method show substantially increased resistance to foaming.

EXAMPLE II

Portions of a partially hydrogenated cottonseed oil having a refractive index of 38 at 60° C. are admixed with varying percentages of calcium stearate, strontium stearate, barium stearate and magnesium stearate. The treated oils and untreated oil are then heated to a deep fat frying temperature of about 375° F. and small pieces of wet bread are fried therein. The following table sets forth the improved results obtained with the modified oils.

TABLE II

| Product | Hours | | | | | | | |
|---|---|---|---|---|---|---|---|---|
| | 2 | 6 | 20 | 26 | 30 | 44 | 50 | 55 |
| Untreated oil | OK | OK | F | F | BF | VBF | VBF | VBF |
| Oil+0.01% calcium stearate | OK | OK | SF | F | F | BF | BF | VBF |
| Oil+0.05% calcium stearate | OK | OK | OK | OK | VSF | F | | |
| Oil+0.1% calcium stearate | OK | OK | OK | OK | OK | SF | F | |
| Oil+0.05% strontium stearate | OK | OK | OK | VSF | F | F | | |
| Oil+0.1% strontium stearate | OK | OK | OK | OK | VSF | SF | | |
| Oil+0.01% barium stearate | OK | OK | SF | F | F | BF | BF | |
| Oil+0.05% barium stearate | OK | OK | OK | SF | F | BF | | |
| Oil+0.1% barium stearate | OK | OK | OK | OK | OK | F | | |
| Oil+0.01% magnesium stearate | OK | OK | SF | F | F | BF | | |
| Oil+0.1% magnesium stearate | | | OK | OK | OK | OK | SF | F |

Key: OK—no foam  VBF—very bad foam
 F—foam  SF—slight foam
 BF—bad foam  VSF—very slight foam

EXAMPLE III

Portions of hydrogenated cottonseed oil having a refractive index of 38 at 60° C. and a free fatty acid content of 0.04% (as oleic acid) are admixed with varying proportions of sulfonated surface active agents. The treated oil and non-treated oil are heated to deep fat frying temperatures and used for frying wet bread. The following table illustrates the results obtained with such frying operations.

TABLE III

| Product | Hours | | | | | | | | |
|---|---|---|---|---|---|---|---|---|---|
| | 2 | 6 | 20 | 26 | 30 | 44 | 50 | 55 | 70 |
| Untreated oil | OK | OK | SF | F | F | BF | VBF | VBF | |
| Oil+0.01% sodium salts of hexadecyl sulphonate and octadecyl sulphonate (MP189) | OK | OK | VSF | VSF | SF | F | | | |
| Oil+0.1% same | OK | OK | VSF | VSF | SF | SF | | | |
| Oil+0.01% sodium salt of dioctyl sulphosuccinate (Aerosol OT) | OK | OK | VSF | SF | SF | F | | | |
| Oil+0.1% same | OK | OK | SF | SF | SF | F | | | |
| Oil+0.01% sodium salts of long chain alkylated naphthalene sulphonates (Nacconol NRSF) | OK | OK | OK | OK | OK | OK | OK | OK | VSF |
| Oil+0.005% same | OK | OK | OK | OK | OK | VSF | SF | SF | F |

EXAMPLE IV

A quantity of hydrogenated cottonseed oil is separated into several portions, to four of which are added different proportions of certain of the above-mentioned improving agents. These, along with some untreated material, are heated to a deep fat frying temperature, about 375° F., and used for frying pieces of moist bread. The heating is continued for several days, meanwhile noting the time at which foaming starts. The free fatty acid content, the refractive index and the viscosity of the samples are determined at the end of the individual tests. The results in comparison to the values of the original oil are given in the following table.

TABLE IV

| Product | Hours heated | Hours before foam started | Per cent F. F. A. as oleic | Refractive index at 60° C. | Viscosity (Pipette method) seconds |
|---|---|---|---|---|---|
| Original oil | | | 0.04 | 38.0 | 26.1 |
| Untreated oil | 55 | 26 | 0.83 | 42.0 | 52.9 |
| Do | 44 | 26 | 0.73 | 41.6 | 49.0 |
| Oil+0.1% calcium stearate | 55 | 44 | | 40.7 | 40.9 |
| Oil+0.05% calcium stearate | 44 | 40 | 0.48 | 40.3 | 38.8 |
| Oil+0.1% magnesium stearate | 55 | 55 | 0.58 | 39.5 | 32.4 |
| Oil+0.1% sodium salt alkylated naphthalene sulphonic acid | 44 | 50 | 0.33 | 39.6 | 33.0 |

The data indicate, as pointed out hereinbefore, that foaming is related to the increase in free fatty acids during the heating and frying, and also to the increase in viscosity and refractive index. The increase in viscosity and refractive index indicates that polymerization is probably taking place. This is further supported by the fact that the iodine value of the deep fat frying agents decreases during heating and frying and the shorter the time before foaming occurs, the greater is the decrease in the iodine value.

It is possible to combine the various treatments to obtain especially effective results, such as the combination of the phosphoric acid treatment along with the use of the insoluble soaps, but although desirable this is not essential.

Obviously many modifications and variations of the invention hereinbefore set forth may be made without departing from the spirit and scope thereof, and therefore only such limitations should be imposed as are indicated in the appended claims.

I claim:

1. A process for improving the resistance to foaming of cooking fats normally tending to foam on heating which comprises adding a small amount of a non-toxic, water insoluble, polyvalent salt of a high molecular weight aliphatic monocarboxylic acid to the cooking fat, said amount being not in excess of about 0.5 per cent and sufficient to substantially prevent said foaming.

2. A process for improving the resistance to foaming of edible fatty materials which comprises adding a small amount of a non-toxic, water insoluble, polyvalent salt of a higher fatty acid to the fatty material, said amount being not in excess of about 0.5 per cent and sufficient to substantially retard said foaming.

3. A process for improving the resistance to foaming of edible fatty materials which comprises adding a small amount of a non-toxic alkaline earth metal salt of a higher fatty acid to the fatty material, said amount being not greatly in excess of about 0.5 per cent and sufficient to substantially inhibit said foaming.

4. A process for improving the resistance to foaming of cooking fats comprising mainly glycerides normally tending to foam on heating which comprises adding about 0.0001% to 0.5% of a non-toxic, water insoluble, polyvalent metal salt of a fatty acid to the cooking fat.

5. A process for improving the resistance of edible non-aqueous fatty materials to foaming when heated to high temperatures which comprises adding about 0.0001% to 0.5% of a non-toxic, alkaline earth metal salt of a higher fatty acid to the non-aqueous fatty material.

6. A process for improving the resistance of glycerides to foaming when heated to a high temperature which comprises adding a small amount of a non-toxic, water insoluble, polyvalent metal salt of a higher fatty acid to the glycerides, said amount being not in excess of about 0.5 per cent and sufficient to substantially retard said foaming.

7. A process for improving the resistance to foaming of edible non-aqueous fatty materials which comprises adding about 0.0001% to 0.5% of a calcium salt of a higher fatty acid to the non-aqueous fatty material.

8. A process for improving the resistance to foaming of edible non-aqueous fatty materials which comprises adding about 0.0001% to 0.5% of a non-toxic alkaline earth metal salt of a higher fatty acid to the non-aqueous fatty material.

9. A process for improving the resistance to foaming of edible fatty materials which comprises adding a small amount of a magnesium salt of a higher fatty acid to the fatty material, said amount being not in excess of about 0.5 per cent and sufficient to substantially retard said foaming.

10. A process for improving the resistance to foaming of edible fatty materials which comprises adding about 0.0001% to 0.5% of calcium stearate to a non-aqueous hydrogenated vegetable fatty acid triglyceride.

11. A cooking fat comprising glycerides normally tending to foam on heating and a small amount of a water-insoluble polyvalent metal salt of a high molecular weight aliphatic monocarboxylic acid, said amount being not in excess of about 0.5 per cent and sufficient to substantially retard said foaming.

12. A substantially non-foaming edible fatty material which comprises a substantially non-aqueous edible fatty material and a small amount of an alkaline earth metal salt of a higher fatty acid, said amount being not in excess of about 0.5 per cent and sufficient to substantially prevent said foaming.

13. An edible fatty preparation comprising an edible fatty acid triglyceride and a small amount of a non-toxic alkaline earth metal salt of a higher fatty acid, said amount being not in excess of about 0.5 per cent and sufficient to substantially retard said foaming.

14. A non-aqueous shortening comprising an edible fatty material and a small amount of a calcium salt of a higher fatty acid, said amount being not in excess of about 0.5 per cent and sufficient to substantially retard said foaming.

15. A non-aqueous shortening comprising an edible fatty material and a small amount of a magnesium salt of a higher fatty acid, said amount being not in excess of about 0.5 per cent and sufficient to substantially retard said foaming.

16. A substantially non-foaming cooking fat comprising mainly glycerides normally tending to foam on heating and about 0.0001% to 0.5% of a non-toxic alkali earth metal salt of a higher fatty acid.

17. A shortening which is resistant to foaming when heated to high temperatures comprising a hydrogenated vegetable oil and 0.1% of calcium stearate.

18. A process for improving the resistance to foaming of edible non-aqueous fatty materials which comprises adding about 0.0001 per cent to 0.5 per cent of calcium stearate to said fatty material.

19. A process of improving the resistance to foaming of edible non-aqueous fatty materials which comprises adding about 0.0001 per cent to 0.5 per cent of magnesium stearate to said fatty material.

20. A process of improving the resistance to foaming of edible non-aqueous fatty materials which comprises adding about 0.0001 per cent to 0.5 per cent of calcium oleate to said fatty material.

21. A substantially non-foaming edible fatty material comprising a substantially non-aqueous edible fatty material and about 0.0001 per cent to 0.5 per cent of calcium stearate.

22. A substantially non-foaming edible fatty material comprising a substantially non-aqueous edible fatty material and about 0.0001 per cent to 0.5 per cent of magnesium stearate.

23. A substantially non-foaming edible fatty material comprising a substantially non-aqueous edible fatty material and about 0.0001 per cent to 0.5 per cent of calcium oleate.

HOWARD C. BLACK.

CERTIFICATE OF CORRECTION.

Patent No. 2,320,319. May 25, 1943.

HOWARD C. BLACK.

It is hereby certified that error appears in the printed specification of the above numbered patent requiring correction as follows: Page 4, first column, line 35, claim 4, before the word "fatty" insert --higher--; and that the said Letters Patent should be read with this correction therein that the same may conform to the record of the case in the Patent Office.

Signed and sealed this 10th day of August, A. D. 1943.

(Seal)

Henry Van Arsdale,
Acting Commissioner of Patents.

CERTIFICATE OF CORRECTION.

Patent No. 2,320,319.  May 25, 1943.

HOWARD C. BLACK.

It is hereby certified that error appears in the printed specification of the above numbered patent requiring correction as follows: Page 4, first column, line 35, claim 4, before the word "fatty" insert --higher--; and that the said Letters Patent should be read with this correction therein that the same may conform to the record of the case in the Patent Office.

Signed and sealed this 10th day of August, A. D. 1943.

(Seal)

Henry Van Arsdale,
Acting Commissioner of Patents.